G. Gerdom,
Bottle Stopper.
No. 94,408. Patented Aug. 31, 1869.

Witnesses.
C. Wahlers
R. Sangmeister

Inventor.
G. Gerdom
Van Santvoord & Hauff
Attys

United States Patent Office.

GREGORY GERDOM, OF ALBANY, NEW YORK.

Letters Patent No. 94,408, dated August 31, 1869.

IMPROVEMENT IN FASTENING METAL TUBES TO GLASS CUPS OR VESSELS.

The Schedule referred to in these Letters Patent and making part of the same.

To all whom it may concern:

Be it known that I, GREGORY GERDOM, of Albany, in the county of Albany, and State of New York, have invented a new and improved Fastening for Metallic Tubes to Glass Cups or Vessels; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
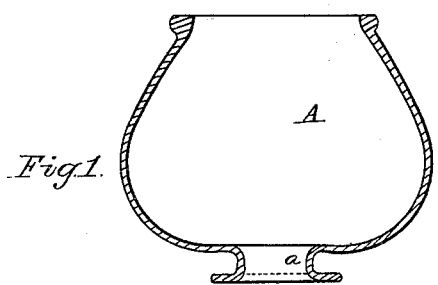
Figure 1 represents a detached section of the glass vessel.

This invention consists in the arrangement of a metallic cup-shaped socket, which is fastened to the metal tube below its end, and made of such a size that it is capable of receiving the neck of the glass vessel which is to be secured to said metal tube, the end of the tube projecting beyond the cup-shaped socket being just long enough to extend a short distance beyond the inner edge of the neck of the glass vessel in such a manner, that by inserting said neck into the cup-shaped socket, and turning the inner end of the metal tube over the edge of the neck, a firm and substantial fastening between the metal tube and glass vessel is effected with or without the use of cement.

In the drawing—

The letter A designates a glass vessel of any desirable form or shape, and provided with a neck, a, to which the metal tube B is to be fastened.

Figure 2:
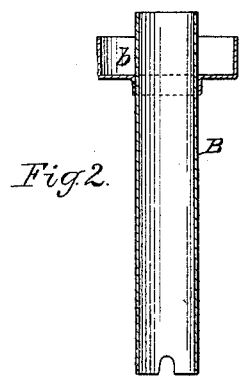
Figure 2 is a similar section of the metal tube.
Figure 3:
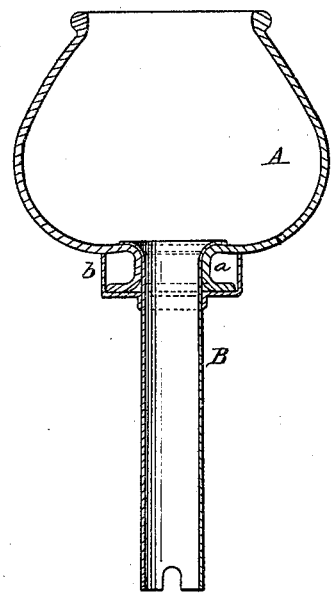
Figure 3 is a longitudinal central section of the glass vessel and metal tube after the same have been fastened together.

This metal tube is just thick enough to pass freely into the neck a of the glass vessel, and it is provided with a cup-shaped socket, b, which is fastened to it at some distance from its end, as shown in fig. 2 of the drawing.

This cup-shaped socket is just large enough to receive the neck of the bottle, and the tube B extends through said socket to such a distance, that when the neck of the glass vessel is placed into the socket, the inner end of the tube projects beyond the inner edge of the neck. If the neck is properly adjusted in the socket, therefore, the tube B can be readily fastened to the vessel. A simply by turning its inner end out over the inner edge of the neck a, and this fastening can be rendered perfectly tight even without the use of cement. But if desired, the cup-shaped socket b may be filled with plaster of Paris or other suitable cement previous to introducing the neck of the glass vessel, and thereby the fastening can be rendered still more secure.

It is obvious that this fastening is applicable to all vessels made of vitreous material, clay, &c.

Having thus described my invention.

What I claim as new, and desire to secure by Letters Patent, is—

A fastening for metal tubes to glass vessels, consisting of the cup-shaped socket b secured to the tube B, and capable of receiving the neck a of the glass vessel, the end of the tube B being made to project through said neck, and turned out over its edge or shoulder, all as shown and described.

This specification signed by me, this 21st day of June, 1869.

GREG. GERDOM.

Witnesses:
W. HAUFF,
E. F. KASTENHUBER.